Figure 1:
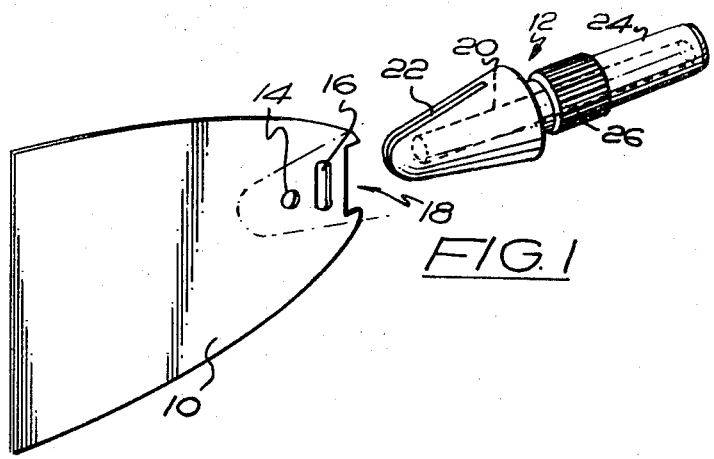

United States Patent [19]

Shire

[11] 3,853,495
[45] Dec. 10, 1974

[54] FITMENT OF HANDLES TO BLADED HAND TOOLS

[75] Inventor: George Cecil Derby Shire, Sheffield, England

[73] Assignee: The Jacobs Manufacturing Company Limited, Sheffield, England

[22] Filed: Feb. 27, 1974

[21] Appl. No.: 446,225

[30] Foreign Application Priority Data
Mar. 5, 1973  Great Britain ..................... 10635/73

[52] U.S. Cl. ...................... 29/460, 30/169, 30/340, 76/104 R, 76/113, 264/261
[51] Int. Cl. ............................................. B23p 3/00
[58] Field of Search .................. 76/104 R, 106, 113; 30/340, 341, 342, 169, 136; 264/261; 29/460

[56] References Cited
UNITED STATES PATENTS

| | | | |
|---|---|---|---|
| 1,806,244 | 5/1931 | Echison | 76/104 R |
| 2,212,197 | 8/1940 | Roesch et al. | 30/169 |
| 3,114,973 | 12/1963 | Kennedy | 30/342 |
| 3,261,095 | 7/1966 | Nelson et al. | 30/169 |

Primary Examiner—Leonidas Valachos
Attorney, Agent, or Firm—Stephen J. Rudy

[57] ABSTRACT

A bladed hand tool, and a method of making such a tool, in which a root portion of a blade is firmly united with a bolster by filler material injected along an axial hole in the bolster to flow along and fill clearance spaces within a slotted blade receiving part of the bolster and the spaces formed in a recessed portion of the blade received in said slotted part.

6 Claims, 5 Drawing Figures

PATENTED DEC 10 1974  3,853,495

FITMENT OF HANDLES TO BLADED HAND TOOLS

The invention relates to the fitment of handles to bladed hand tools and has for its object to provide an improvement therein.

According to one aspect of the invention, there is provided a method of making a bladed hand tool, the method including the steps of forming a bolster having a hole extending axially from one end to within a short distance of its other end, slotting said other end to a depth sufficient to intersect said axial hole, the width of the slot being less than the diameter of the hole extending axially of the bolster, forming a blade with a root end having at least one hole or slot or having a grooved or indented configuration, inserting said root end of the blade into the slot in the bolster so that the hole or holes or slot or slots, or grooves or indentations as the case may be of said blade are hidden by the bolster, and injecting a molten metal, or adhesive or other filler material along the axial hole of the bolster so that it flows into the hole or holes, slot or slots, or grooves or indentations as the case may be in the root end of the blade to firmly unite the bolster and blade. The root end of the blade may be formed with a straight end surface which is to seat in the bottom of the slot in the bolster. On the other hand, said root end of the blade may be formed with a notched form, the width of the notch being such that the bottom of the notch can seat in the bottom of the slot in the bolster. The bolster may be formed with a splined or knurled portion on which a wooden or synthetic plastics handle is to be fitted. The slotted end of the bolster will preferably have a conical or frusto-conical enlarged portion which in the completed tool will preferably flow smoothly into the external surface of the handle.

According to a further aspect of the invention, there is provided a bladed hand tool which has been made by the method described above.

Figure 2:
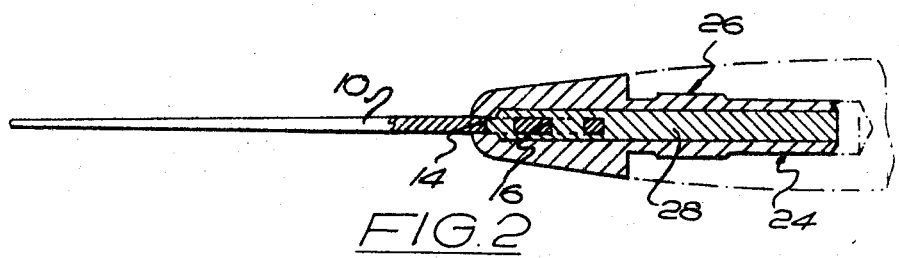
Figure 3:
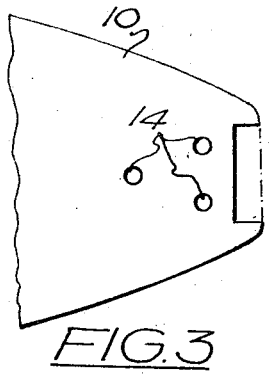
Figure 4:
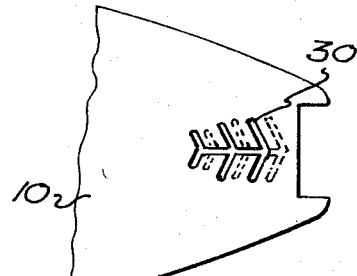
Figure 5:
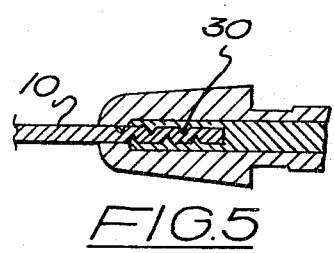

In order that the invention may be fully understood and readily carried into effect, the same will now be described, by way of example only, with reference to the accompanying drawings, of which:

FIG. 1 is an exploded part-sectional view of a blade and bolster for fitment thereto, FIG. 2 is a sectional view of the blade and bolster after they have been united together, and FIGS. 3, 4 and 5 are views which will presently be referred to illustrating possible modifications which may be made.

Referring now to FIG. 1 of the drawings, there is there illustrated a blade 10 and bolster generally indicated 12 for fitment thereto.

The blade 10 (in this case for a painters scraper tool) is provided at a root end with a hole 14 and slot 16 and also with a notched outline shape as indicated by reference numeral 18.

The bolster 12 has a hole 20 extending axially from one end to within a short distance of its other end, and a slot 22 at said other end which intersects said hole. The slot 22 is of a width sufficient to receive the root end of the blade 10 and the hole 20 is of somewhat larger diameter than the width of said slot so that when the root end of the blade is received in said slot it does not completely block the hole 20. A shank portion 24 of the bolster, from the end of which the hole 20 has been drilled, is provided with a serrated portion 26.

In FIG. 2, the blade and bolster are shown to have been brought together and firmly united by the injection, through the hole 20 of the bolster, of molten white metal 28 which has been able to flow along the hole, that is to say along the space formed by the hole along each side of the blade, and into the hole 14 and slot 16 in the root end of the blade and along any clearance between the side surfaces of the blade and the slot in the bolster, the hole 14 and slot 16 both having been hidden as the blade and bolster have been brought together, and the correct location of the two having been facilitated by the plain portion of the bolster seating in the notched portion of the blade. A wooden or synthetic plastics handle is shown in chain-dotted lines in FIG. 2 to have subsequently been fitted to the shank portion 24 of the bolster, being retained firmly thereon by the serrated portion of the latter. The substantially frusto-conical surface of the slotted end of the bolster is shown to flow smoothly into the external surface of the handle.

It has been found that the manner in which the blade and bolster have been firmly united together has resulted in a virtually integral article being produced without undue expense due to the fact that the construction lends itself to the use of relatively fast assembly methods.

However, various modifications may be made without departing from the scope of the invention. For example, in FIG. 3 there is illustrated a very minor modification whereby the root end of the blade has been provided with three holes 14 instead of one such hole and slot 16. Furthermore, it will be understood that, as shown in chain-dotted lines in FIG. 3, the root end of the blade need not necessarily be of notched outline shape but could be straight.

In FIGS. 4 and 5 there is illustrated a further possible modification whereby instead of being provided with a hole or slot, or combination of holes and slots, the root end of the blade has a grooved or indented configuration. In FIG. 4 such grooves or indentations in the root end of the blade are shown to have a "herringbone" form, the grooves or indentations on one side being staggered with respect to those on the other side. In FIG. 5, which is a fragmentary view similar to FIG. 2, the blade shown in FIG. 4 has been brought together with a bolster as previously described, the two having been firmly united by white metal which in this case of course has filled the grooves or indentations.

Various other modifications may of course be made without departing from the scope of the invention. For example, it will be understood that instead of molten white metal being used to firmly unite the blade and bolster any other suitable molten metal may be used or indeed a suitable adhesive or other filler material such as a synthetic plastics material could be used.

What I claim and desire to secure by Letters Patent is:

1. In a method of making a bladed hand tool, the steps of forming a bolster having a hole extending axially from one end to within a short distance of its other end; slotting said other end to a depth sufficient to intersect said axial hole, the width of the slot being less than the diameter of the hole extending axially of the bolster; forming a blade with a root end having at least one recess; inserting said root end of the blade into the slot in the bolster so that the recessed portion of said blade is hidden by the bolster; and injecting a filler material along the axial hole of the bolster so that it flows into the recessed portion of the blade to firmly unite the bolster and blade.

2. In a method of making a bladed hand tool according to claim 1, the root end of the blade being formed with a straight end surface which is to seat in the bottom of the slot in the bolster.

3. In a method of making a bladed hand tool according to claim 1, the root end of the blade being formed with a notched form, the width of the notch being such that the bottom of the notch can be seated in the bottom of the slot in the bolster.

4. In a method of making a bladed hand tool according to claim 1, the bolster being formed with a splined or knurled portion on which a wooden or synthetic plastics handle is to be fitted.

5. In a method of making a bladed hand tool according to claim 1, the slotted end of the bolster being formed with a frusto-conical enlarged portion which in the completed tool will flow smoothly into the external surface of the handle.

6. In a bladed hand tool, a bolster united at one end to a handle and united at its other end to a root end of a blade, the bolster having been formed with a hole extending axially from said one end to within a short distance of its other end and said other end having been slotted for the reception of the root end of the blade to a depth sufficient to have intersected the axial hole, the width of the slot being less than the diameter of said hole, the root end of the blade having been recessed within an area hidden by the bolster and a filler material having been injected along the axial hole in the bolster so that it has flowed into the recessed portion of the blade to firmly unite said bolster and blade.

* * * * *